(12) United States Patent
Hall et al.

(10) Patent No.: US 6,769,811 B2
(45) Date of Patent: Aug. 3, 2004

(54) MULTI-FIBER OPTIC DEVICE

(75) Inventors: Thomas A. Hall, Oxford, MS (US);
Richard C. E. Durrant, Suffolk (GB);
Mark Krowiak, Schaumburg, IL (US)

(73) Assignee: Stratos International, Inc., Chicago, IL (US)

( * ) Notice: Subject to any disclaimer, the term of this patent is extended or adjusted under 35 U.S.C. 154(b) by 147 days.

(21) Appl. No.: 10/231,563

(22) Filed: Sep. 3, 2002

(65) Prior Publication Data
US 2004/0042731 A1 Mar. 4, 2004

(51) Int. Cl.[7] .................................................. G02B 6/38

(52) U.S. Cl. .............................. 385/59; 385/55; 385/56; 385/58

(58) Field of Search ........................... 385/54, 59, 63, 385/65, 8, 115, 116, 120, 121

(56) References Cited

U.S. PATENT DOCUMENTS

| 4,964,688 A | 10/1990 | Caldwell et al. ............... 350/96 |
| 5,214,730 A | 5/1993 | Nagasawa et al. ............. 385/59 |
| 5,315,678 A | 5/1994 | Maekawa et al. ............. 385/59 |
| 5,379,360 A | 1/1995 | Ota et al. ...................... 385/59 |
| 5,867,620 A | 2/1999 | Bunin et al. ................... 285/53 |
| 5,909,528 A | 6/1999 | Tamekuni et al. ........... 385/137 |
| 6,422,760 B1 * | 7/2002 | Matasek et al. ............... 385/60 |
| 6,434,316 B1 * | 8/2002 | Grois et al. .................. 385/139 |
| 6,623,173 B1 * | 9/2003 | Grois et al. .................... 385/76 |
| 6,676,299 B1 * | 1/2004 | Durrant et al. ................ 385/71 |
| 2003/0103743 A1 * | 6/2003 | Sun et al. .................... 385/114 |

* cited by examiner

Primary Examiner—Phan T. H. Palmer
Assistant Examiner—Jennifer Doan
(74) Attorney, Agent, or Firm—Karl D. Kovach

(57) ABSTRACT

A multi-fiber optic device includes two optical fibers and a body. The body is formed around and adhered to the two optical fibers. The body includes two alignment bosses, a mating end and a tapered end. Each alignment boss includes an alignment aperture.

29 Claims, 5 Drawing Sheets

MULTI-FIBER OPTIC DEVICE

BACKGROUND OF THE INVENTION

1. Field of the Invention

The present invention pertains to the field of fiber optics. The invention more particularly concerns a device which provides for the termination of multiple optical fibers in a single ferrule.

2. Discussion of the Background

During the late 1990s and into the early 2000s, optical fiber based data transmission systems flourished. Optical fiber based systems were installed in buildings, between buildings in the same city, between buildings in different cities, and between buildings on different continents.

Optical fibers are also installed on spans which are not so expansive. Optical fibers run between devices, such as host devices used for communication or data transmission, housed within the same building. Multiple host devices are typically installed in rack-like structures. The back side of the rack structure can become entangled with multiple optical fibers. The optical fibers run between host devices located in the same rack and between host devices located on different racks. Finding a single optical fiber out of the large group of entangled optical fibers is a frustrating and time consuming process. Additionally, when optical fibers become entangled some of the optical fibers can be stressed and bent past their permissible bend radii, thus leading to optical power loss of the transmitted signal and potentially a catastrophic fracture failure of the optical fiber itself.

To combat the problem, some end-users have tried to organize the optical fibers by color coding optical fibers and also by grouping some of the optical fibers, in certain locations, together with tie-wraps. A more logical and organized approach to the management of optical fibers is provided by Advanced Interconnection Technologies, a Stratos Lightwave, Inc., company, and is commonly known as flex circuitry which can be an optical backplane. In a basic form, flex circuitry includes a flexible polymer layer onto which is applied optical fibers in a pre-set arrangement and then a second flexible polymer layer is placed on top of the optical fibers and affixed to the first flexible polymer layer so as to encase and protect and maintain the arrangement of the optical fibers. The optical fibers are typically terminated with one or a combination of more than one of the now well known fiber optic connectors, such as MT, MP, MPX, SC, MDDI, LC, HBMT, MU, ST, FC, and other connector form factors.

Terminating flex circuitry is time consuming and labor intensive, since, typically, multiple optical fibers are terminated into a single ferrule. Multi-fiber, single ferrule terminations are complex since each optical fiber must be at approximately the same termination location. Assuming a ferrule accommodates eight optical fibers, and seven of the eight optical fibers are correctly terminated to the desired termination location and then the eighth optical fiber is incorrectly terminated to a shorter length, then the remaining seven optical fibers must be reterminated to the new termination location.

Adding to the overall problem is the fact that known multi-fiber ferrules have their own unique problems. Many known multi-fiber ferrules are molded using precision molding techniques, such as transfer molding or injection molding. Each molding technique is discussed in turn. A ferrule formed by precision molding typically provides apertures for the insertion of optical fibers. The optical fibers are bonded to the ferrule with epoxy. The holes need to provide a clearance of between one-half micro-meters and two micro-meters. Due to the nature of the molding process, there is a slight variation in the true position of the holes relative to the target or intended position of the holes. Also, there is a slight variation in the diameter of the optical fibers. The float of the optical fiber is the combination of the amount of over size of the hole, the true position of the hole, and the size of the diameter of the optical fiber. The optical fiber is then offset, due to the float, away from the intended position which causes the optical fiber to be offset relative to a coupling fiber. The offset results in optical power loss. Such a ferrule 91 is shown in FIG. 1.

The ferrule 91 of FIG. 1 is an MT-style multi-fiber optic device. The device includes a body 92 which has alignment holes 93, 94 and apertures which accommodate terminated ends 95 of optical fibers at a mating end 101, and a window 98. The body 92 is formed by flowing a resin into a mold. It is believed that the resin flows into the mold near locations 99, 100. The optical fibers 97 of the multi-fiber optical cable 96 are inserted into the body 92 until their ends are nearly flush with the mating end 101. Then an adhesive such as an epoxy is introduced into the window 98 so as to affix the multi-fiber optical cable stripped of its matrix 97 to the body 92.

The relatively large mass at the dimensionally critical mating end 101 of the body 92 incurs an associated relatively large shrink rate once the flowable resin solidifies inside the mold. The shrinkage causes the optical fiber apertures and alignment holes 93, 94 to move in undesired and in uncontrolled ways relative to each other. Additionally, the presence of the window 98 causes a warping effect, since, during molding, the flowable resin flows around a core pin which forms the window. Such a flow pattern is unstable and causes differential stresses in the solidified part. The stresses cause the body 92 to warp, thus changing the geometry of the mating end 101 from its ideal form or shape.

Overmolding or injection molding includes flowing the resin around optical fibers in a mold, thus eliminating the clearance between the optical fibers and their associated apertures in the description provided above. However, overmolding does not eliminate the dimensional errors introduced by flowing the resin into the mold at a location far from the mating end.

Thus, there is a need for a method or device which terminates multiple optical fibers of a single ferrule which is less time consuming to assemble, is more reliable, and is more dimensionally accurate than known methods and devices.

SUMMARY OF THE INVENTION

Therefore, it is an object of the invention to provide a multi-fiber optic device which is easily assembled.

It is another object of the present invention to provide a multi-fiber optic device which is reliable.

It is yet another object of the present invention to provide a multi-fiber optic device which is dimensionally accurate.

It is still yet another object of the present invention to provide a method of making a multi-fiber optic device.

In one form of the invention, the multi-fiber optic device includes two optical fibers and a body. The body is formed around and adhered to the two optical fibers. The body includes two alignment bosses, a mating end, and a tapered end. Each alignment boss includes an alignment aperture.

In another form of the invention, the multi-fiber optic device includes two optical fibers and a body. The body is formed around and adhered to the two optical fibers. The body includes two alignment bosses, a tapered portion, a mating end, and a tapered end. Each alignment boss includes an alignment aperture. Both of the optical fibers have respective polished ends and splicing ends. The length of both of the two optical fibers are substantially the same, and both of the two optical fibers are substantially parallel to each other. Furthermore, both of the two alignment apertures are substantially parallel to each other and are also substantially parallel to the two optical fibers. The two alignment apertures and the two optical fibers form a plane. The body is substantially symmetric about the plane. The two alignment bosses straddle the two optical fibers. The mating end of the body and the tapered end of the body straddle the two alignment bosses. The mating end of the body and the tapered end of the body straddle the tapered portion of the body. The length of the two optical fibers is greater than the length separating the mating end of the body from the tapered end of the body. The polished ends of the two optical fibers are substantially flush with the mating end of the body.

In yet another form of the invention, the multi-fiber optic device includes two optical fibers, a body, and a sheath. The body is formed around and adhered to the two optical fibers. The body includes two alignment bosses, a mating end, and a tapered end. Each alignment boss includes an alignment aperture. The sheath includes an aperture for receiving the body, and another aperture which is in communication with the other aperture. The second aperture is capable of receiving an adhesive material so that the sheath is bonded to the body.

In still yet another form of the invention, the multi-fiber optic device is made according to a method. The steps of the method are as follows: stripping a matrix away from a multi-fiber optic cable so as to expose optical fibers; inserting the optical fibers into a mold; introducing a flowable polymer into the mold; extracting heat from the mold so that the flowable polymer solidifies around and adheres to the optical fibers so as to form a body having optical fibers; removing the body having optical fibers from the mold; cleaving the optical fibers extending past a first end of the body; cleaving the optical fibers extending past a second end of the body so as to form splicing ends of the optical fibers; polishing the optical fibers adjacent to the first end of the body; inserting optical fibers of a flex circuit through a first aperture of a sheath; positioning the splicing ends of the optical fibers of the body adjacent to ends of the optical fibers of the flex circuit; splicing the splicing ends of the optical fibers of the body to the ends of the optical fibers of the flex circuit so as to form a spliced area; positioning the sheath around the body so as to encompass the spliced area; introducing an adhesive material into a second aperture of the sheath so that the adhesive material contacts the sheath and the body; and curing the adhesive material so that the sheath is bonded to the body.

Thus, the multi-fiber optic device and method of the invention is superior to existing solutions since the resulting device is reliable, is easy to assemble, and has dimensional stability as compared to prior art devices.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 3:
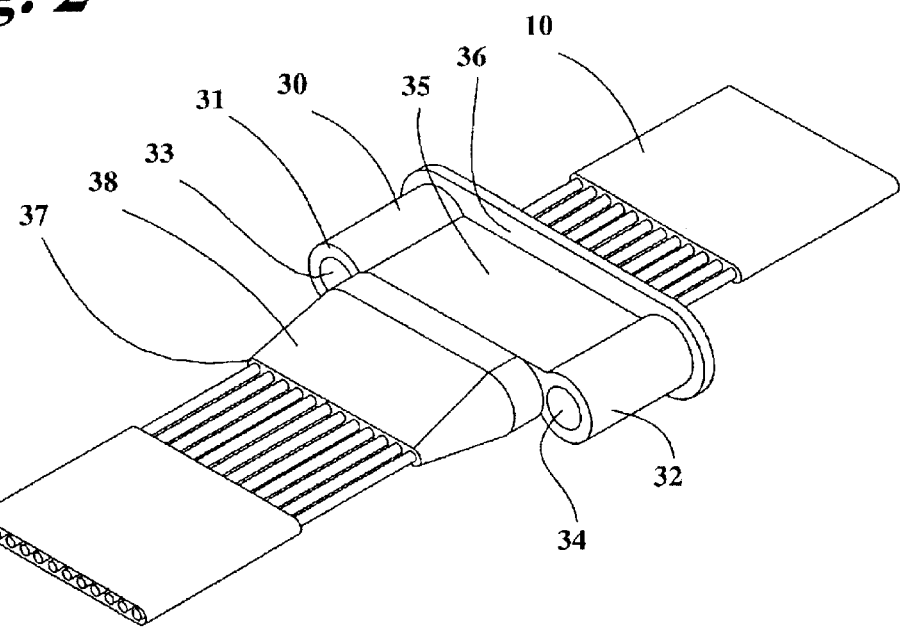
FIG. 3 is a perspective view of a body formed around and adhered to the optical fibers of the multi-fiber optic cable of FIG. 2.
Figure 4:
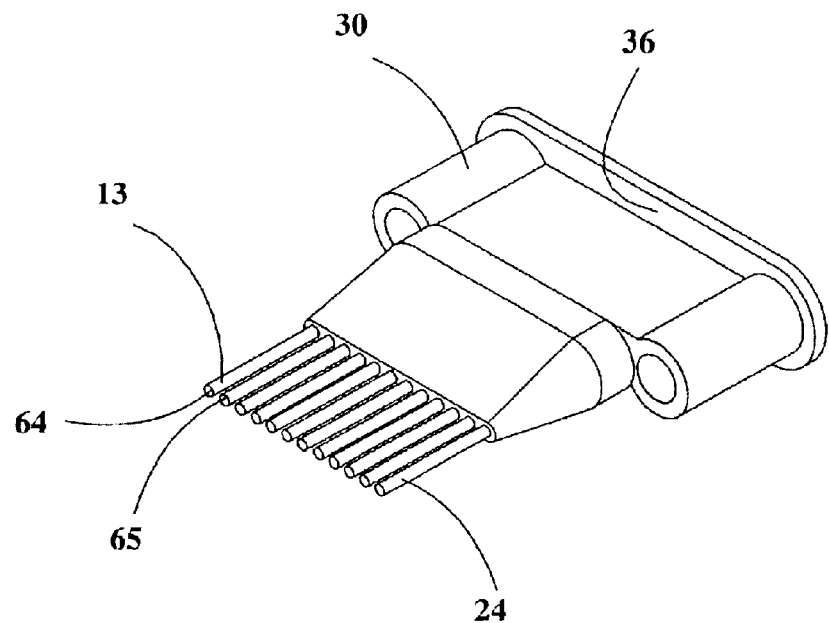
FIG. 4 is a perspective view of the body of FIG. 3 after matrix-containing-ends of the multi-fiber optic cable have been cleaved away.
Figure 5:
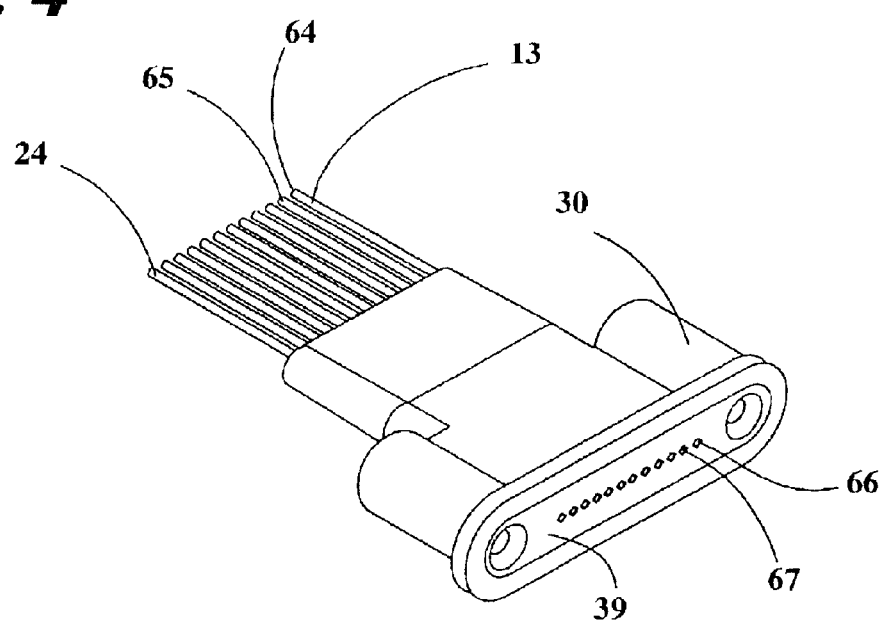
FIG. 5 is another perspective view of the body of FIG. 4 taken from a different angle.
Figure 6:
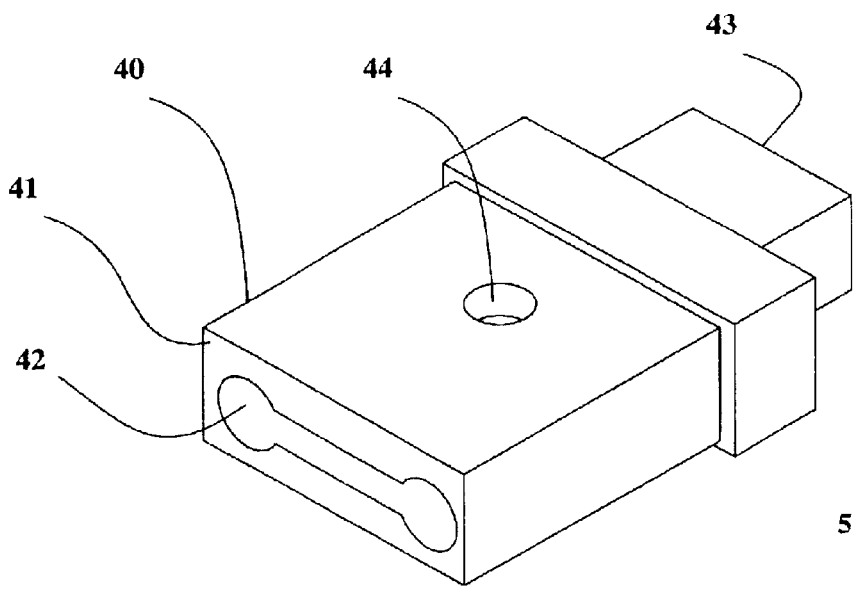
FIG. 6 is a perspective view of a sheath.
Figure 7:
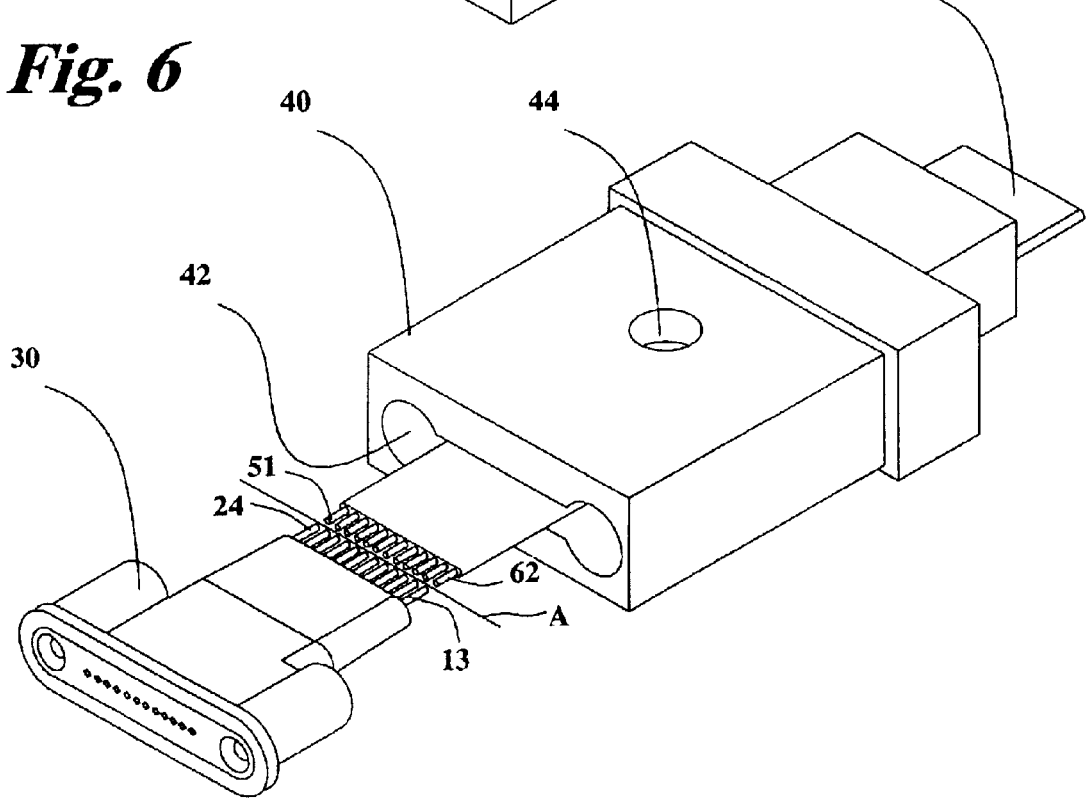
FIG. 7 is a perspective view of the body of FIG. 4, the sheath of FIG. 6, and the multi-fiber optic segment extending from a flex circuit.
Figure 8:
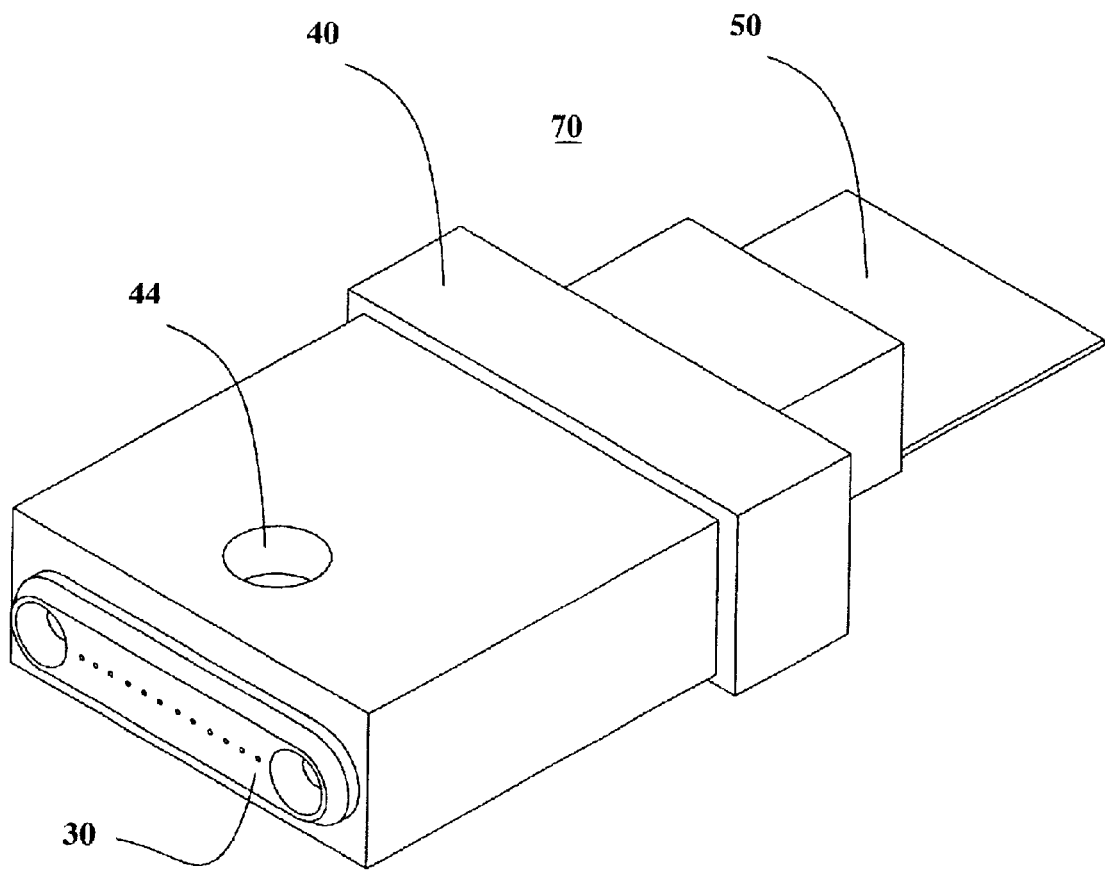
FIG. 8 is a perspective view of the assembled multi-fiber optic device.

Referring now to the drawings, wherein like reference numerals designate identical or corresponding parts throughout the several views, and more particularly to FIG. 3-5 thereof, is a body 30, and more particularly to FIGS. 6–8 thereof, is a device 70.

Figure 2:
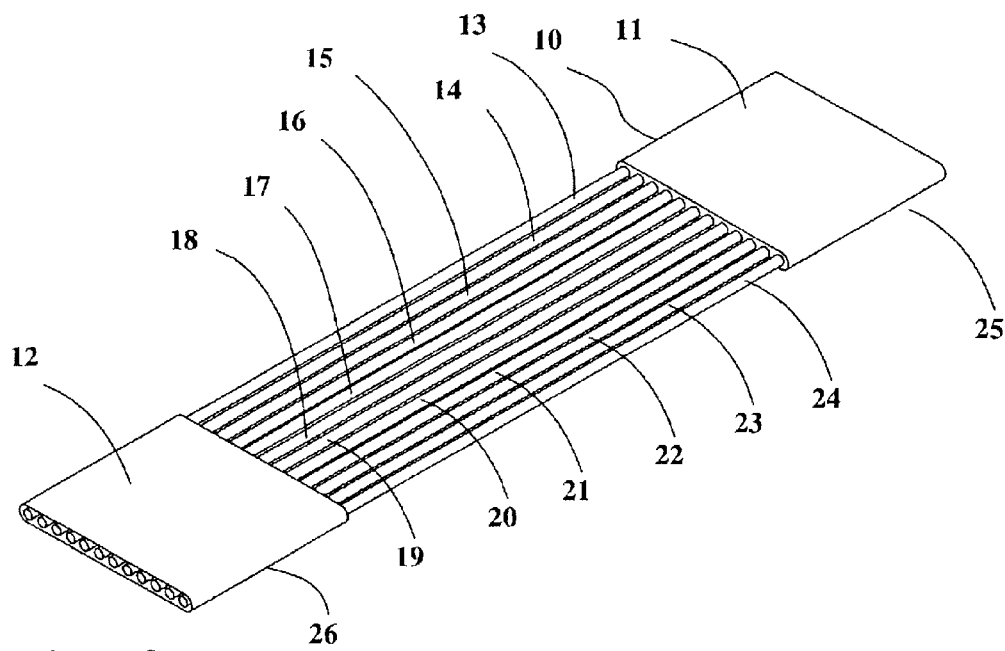
FIG. 2 is a perspective view of a multi-fiber optic cable having a portion the matrix removed.

FIG. 2 is a perspective view of a multi-fiber optic cable 10 having a portion of the matrix removed. The multi-fiber optic cable 10 retains matrix 25, 26 at ends 11, 12. Between ends 11, 12 of matrix 25, 26, the matrix has been removed to expose the twelve optical fibers 13–24. The twelve optical fibers 13–24 are substantially parallel to each other.

FIG. 3 is a perspective view of a body 30 formed around and adhered to the optical fibers 13–24 of the multi-fiber optic cable 10. The body 10 includes two alignment bosses 31, 32, a tapered portion 38, a mating end 39 (see FIG. 5), and a tapered end 37. Each alignment boss 31, 32 has a respective alignment aperture 33, 34. The two alignment bosses 31, 32 straddle the optical fibers 13–24. The mating end 39 and the tapered end 37 straddle the tapered portion 38 and the alignment bosses 31, 32. The alignment apertures 33, 34 are substantially parallel to each other. The alignment apertures 33, 34 are substantially parallel to the optical fibers 13–24. The alignment apertures 33, 34 and the optical fibers 13–24 form a plane. The body 30 is symmetric about the plane.

FIGS. 4 and 5 are perspective views of the body 30 of FIG. 3 after the optical fibers 13–24 have been cleaved near the tapered end 37 of the body 30 and adjacent to the mating end 39 of the body 30. The ends of the optical fibers 13–24 adjacent to the mating end 39 of the body 30 are polished so as to be substantially flush with the mating end 39 and are known as polished ends 66, 67. The ends of the optical fibers 13–24 near the tapered end 37 of the body 30 have a length of the optical fibers exposed so that they may be spliced to other optical fibers, thus the ends of these optical fibers are known as splicing ends 64, 65. A total length of an optical fiber is measured from the splicing end to the polished end of each optical fiber 13–24. The length of each optical fiber is substantially equal to one another. A length of the body 30 is measured from the mating end 39 to the tapered end 37. The length of the optical fibers 13–24 is greater than the length of the body 30.

FIG. 6 is a perspective view of a sheath 40. The sheath 40 includes a first aperture 42 and a second aperture 44. The first aperture 42 extends from a first end 41 of the sheath 40 to a second end 43 of the sheath 40. The second aperture 44 is in fluidic communication with the first aperture 42. The first aperture 42, at the first end 41 of the sheath 40, is formed so as to be complimentary to a shape of the body 30. The first aperture 42, at the second end 43 of the sheath 40, is formed so as to be complimentary to a shape of a multi-fiber optic cable which for example could be extending from a flex circuit.

FIG. 7 is a perspective view of the body 30, the sheath 40, and a segment of a multi-fiber optic cable 50 which could be extending from a flex circuit (not shown). The splicing ends 64, 65 of the optical fibers 13–24 of the body 30 are lined-up adjacent to an imaginary axis A. Also lined-up adjacent to the imaginary axis A are terminal ends of optical fibers 51, 62. As shown in FIG. 7, there are twelve optical fibers associated with the body 30 and there are twelve optical fibers associated with the multi-fiber optic cable 50. Each optical fiber of the body 30 is associated with a respective optical fiber of the multi-fiber optic cable 50. Optical fiber 24 is associated with optical fiber 51, and optical fiber 13 is associated with optical fiber 62. The ends of the optical fibers 24, 51 and 13, 62, along with the other optical fibers are in close proximity with each other. The ends of the fibers 24, 51 and 13, 62 along with the other ends are spliced together. The splicing may occur by way of apply heat with a lasing device, or by applying heat with conventional methods, which are known in the art, or by mechanical means, which are also known in the art.

FIG. 8 is a perspective view of the assembled multi-fiber optic device 70. As compared to FIG. 7, the sheath 40 is slid over the body 30 until a ledge surface 36 (see FIG. 4) of the body 30 contacts the first end 41 (see FIG. 6) of the sheath 40. At that time an adhesive material (not shown) can be introduced into the second aperture 44 of the sheath. The adhesive material contacts both the sheath 40 and the body 30. Once the adhesive material is cured, the sheath 40 is bonded to the body 30. In a preferred embodiment, the multi-fiber optic device 70 is compatible with and mateable to a receptacle for a MT-style connector.

Figure 1:
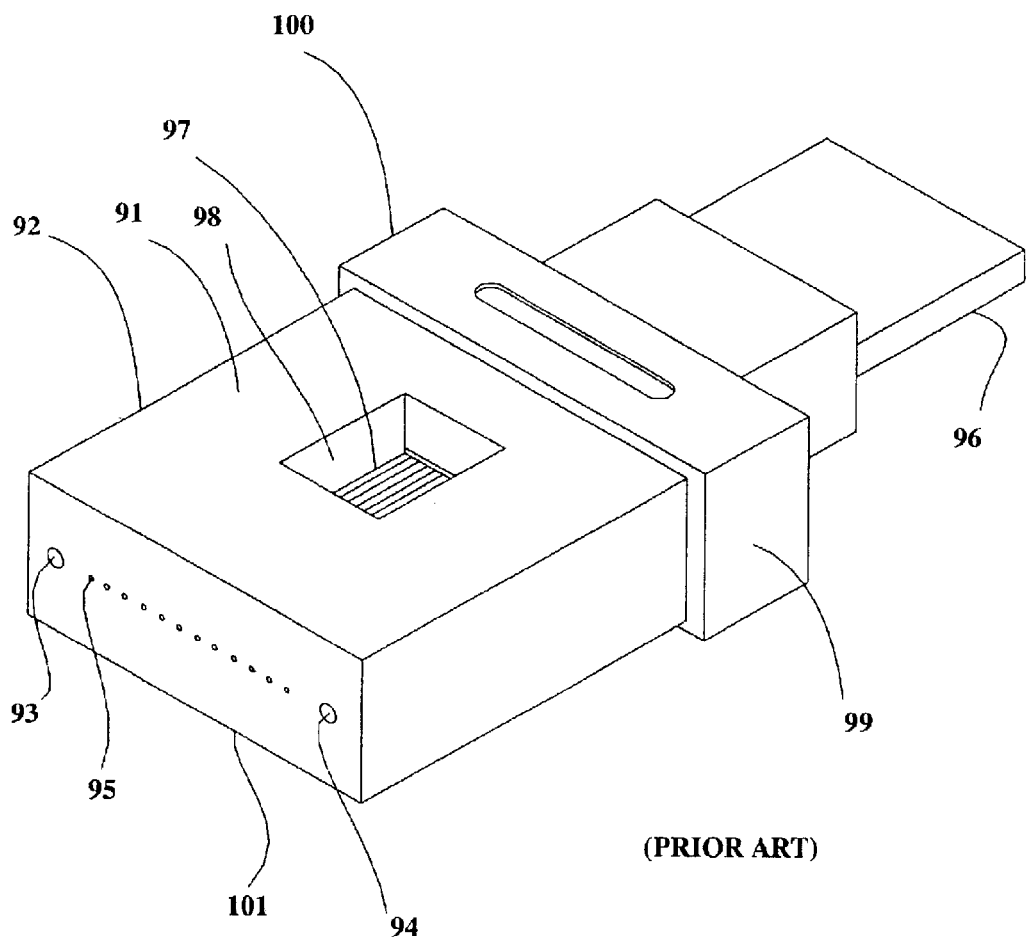
FIG. 1 is a perspective view of a prior art multi-fiber optic ferrule.

The two piece (body 30 and sheath 40) construction of the device 70 eliminates some of the problems associated with the prior art device 91 which is a single piece construction as shown in FIG. 1. The multi-fiber optic device 70 of the invention includes a high precision molded body 30, and a sheath 40 which need not be formed with dimensional accuracy approaching that required for the body 30. As discussed above, the dimensions of the prior art device 91 are difficult to control. The difficulty in part is attributed to the geometry of the single piece structure 92 of the device 91, the window 98, the location 99, 100 of the introduction of the mold material, and the size of the body 92. The critical dimensions in the device 91 are the locations of the aligrunent holes 93, 94 relative to the terminated ends of the optical fibers 95 at the mating end 101.

The basic steps required to manufacture the multi-fiber optic devices 30, 70 are setout below. A portion of the matrix is removed or stripped from a multi-fiber optic cable 10, as is shown in FIG. 1, so as to expose portions of the optical fibers 13–24. The optical fibers 13–24 are placed in a mold with the ends 11, 12 of the multi-fiber optic cable 10 protruding from the mold. The molding process is a precision overmolding technique. The orientation of the optical fibers 13–24 relative to one another and relative to the alignment apertures 33, 34 to be formed within the mold are of the upmost importance. The body 30 is formed of a polymer material. The polymer material is heated so that the flowable polymer material is introduced into the mold. The flowable polymer material is introduced into the mold in two locations. One location is near the area identified by numeral designator 35 in FIG. 3, which is typically defined as a location between the mating end 39 and the tapered end 37 of the body 30. The other location is symmetrically located on the other side of the body 30.

Heat is then extracted from the mold so that the flowable polymer material solidifies around and adheres to the optical fibers 13–24 so as to form a body 30 having optical fibers. The body 30 having optical fibers is then removed from the mold as is shown in FIG. 3. The preferred polymer material has a coefficient of thermal expansion that is substantially the same as a coefficient of thermal expansion of the optical fibers so as to reduce the effects of stress due to differential thermal expansion of the different material, such as buckling and delamination. When the body 30 is molded as described above, the body is molded to exacting dimensions since the body 30 is relatively small, and symmetric as compared to the body 92 of FIG. 1. Thus, the amount of unknown sources of shrinkage are nearly eliminated and the amount of known sources of shrinkage are minimized. Therefore, the resulting body 30 is dimensionally accurate and does not warp.

Next, the optical fibers extending past the first end or mating end 39 of the body 30 are cleaved. Then the optical fibers extending past the second end or tapered end 37 of the body 30 are cleaved so as to form splicing ends 64, 65 of the optical fibers, as shown in FIGS. 4 and 5. The cleaving process can be mechanical such as by scoring the surface of the optical fibers and then bending the optical fibers so as to cause the optical fibers to fracture along the score lines. The cleaving process can also be achieved by applying great amounts of heat to the optical fibers so as to cut the optical fibers in two. In one example, the application of heat is achieved by focusing a laser beam on the optical fibers from a lasing device. The optical fibers adjacent to the mating end 39 of the body 30 are polished so as to form polished ends 66, 67 of the optical fibers. The polished ends 66, 67 of the optical fibers are substantially flush with the mating end 39 of the body 30, as shown in FIG. 5. The polishing can be performed by way of mechanical, or chemical, or chemical/mechanical methods that are well known in the art.

The sheath 40 is molded and is made of a polymer material. Since the body 30 contains the features that require dimensional accuracy, the sheath 40 need not be molded so accurately, and the sheath 40 need not be made as small as the body 30, and the sheath 40 need not have the symmetry of the body 30. The sheath 40 is then introduced to the assembly along with optical fibers 51, 62 of a multi-fiber optic cable 50 from another part such as a flex circuit (not shown). The optical fibers 51, 62 of the multi-fiber optic cable 50 are inserted into the first aperture 42 of the sheath 40, as shown in FIG. 7.

Then, the splicing ends 64, 65 of the optical fibers 13–24 of the body 30 are positioned adjacent to the ends 51, 62 of the optical fibers of the flex circuit as shown in FIG. 7. Next, the splicing ends of the optical fibers 13–24 of the body 30 are spliced to ends 51, 62 of the optical fibers of the flex circuit so as to form a spliced area. The step of splicing may be performed mechanically or by application of heat provided by a lasing device. The sheath 40 is then positioned around the body 30 so as to encompass the spliced area, as shown in FIG. 8. The tapered portion 38 of the body 30 provides for an easy assembly of the body 30 into the aperture 42 of the sheath 40. The sheath 40 and the body 30 are positioned so that the ledge surface 36 of the body 30 contacts the first end 41 of the sheath 40.

An adhesive such as an epoxy is introduced into the second aperture 44 of the sheath 40 so that the adhesive material contacts the sheath 40 and the body 30. When the adhesive material is cured, the body 30 is bonded to the sheath 40. In one example, the adhesive material is made curable by exposing it to U.V. radiation, and the sheath 40 is made of a polymer material that is transparent to U.V. radiation. Then the assembly is exposed to U.V. radiation so as to cure the adhesive material. Other suitable adhesive materials may also be used. The chosen adhesive material can have a coefficient of thermal expansion, that once cured, is substantially the same as the coefficient of thermal expansion of the optical fibers, where the optical fibers are typically made of glass.

Obviously, numerous modifications and variations of the present invention are possible in light of the above teachings. It is therefore to be understood that within the scope of the appended claims, the invention may be practiced otherwise than as specifically described herein.

What is claimed is:

1. A multi-fiber optic device comprising:
   a first optical fiber;
   a second optical fiber; and
   a body having a first alignment boss, a second alignment boss, a mating end, and a tapered end, the first alignment boss having a first alignment aperture, the second alignment boss having a second alignment aperture, the body formed around and adhered to the first optical fiber and the second optical fiber.

2. A multi-fiber optic device according to claim 1 wherein the body has a tapered portion.

3. A multi-fiber optic device according to claim 2 wherein the first optical fiber has a polished end and a splicing end.

4. A multi-fiber optic device according to claim 3 wherein the second optical fiber has a polished end and a splicing end.

5. A multi-fiber optic device according to claim 4 wherein the first optical fiber has a first length.

6. A multi-fiber optic device according to claim 5 wherein the second optical fiber has a second length.

7. A multi-fiber optic device according to claim 6 wherein the first length of the first optical fiber is substantially the same as the second length of the second optical fiber.

8. A multi-fiber optic device according to claim 7 wherein the first optical fiber is substantially parallel to the second optical fiber.

9. A multi-fiber optic device according to claim 8 wherein the first alignment aperture, the second alignment aperture, the first optical fiber, and the second optical fiber form a plane.

10. A multi-fiber optic device according to claim 9 wherein the first alignment aperture is substantially parallel to the first optical fiber.

11. A multi-fiber optic device according to claim 10 wherein the first alignment aperture is substantially parallel to the second alignment aperture.

12. A multi-fiber optic device according to claim 11 wherein the body is symmetric about the plane.

13. A multi-fiber optic device according to claim 12 wherein the first alignment boss and the second alignment boss straddle the first optical fiber and the second optical fiber.

14. A multi-fiber optic device according to claim 13 wherein the mating end of the body and the tapered end of the body straddle the first alignment boss and the second alignment boss.

15. A multi-fiber optic device according to claim 14 wherein the mating end and the tapered end straddle the tapered portion.

16. A multi-fiber optic device according to claim 15 wherein the mating end of the body is separated from the tapered end of the body by a third length, and wherein the first length of the first optical fiber is greater than the third length.

17. A multi-fiber optic device according to claim 16 wherein the mating end of the first optical fiber and the mating end of the second optical fiber are substantially flush with the mating end of the body.

18. A multi-fiber optic device according to claim 17, further comprising a sheath having first end, a second end, a first aperture extending from the first end to the second end, and a second aperture in communication with the first aperture, the first aperture at the first end being formed so as to be complementary to a shape of the body, and the first aperture at the second end being formed so as to be complementary to a shape of a multi-fiber optic cable extending from a flex circuit, and wherein the ledge surface of the body contacts the first end of the sheath.

19. A multi-fiber optic device according to claim 18, further comprising an adhesive material in the second aperture for bonding the body to the sheath, and wherein the multi-fiber optic device is compatible with and mateable to a receptacle for a MT-style connector.

20. A multi-fiber optic device comprising:
   a first optical fiber having a polished end and a splicing end, the first optical fiber has a first length;
   a second optical fiber having a polished end and a splicing end, the second optical fiber has a second length, and wherein the first length of the first optical fiber is substantially the same as the second length of the second optical fiber, and wherein the first optical fiber is substantially parallel to the second optical fiber; and
   a body having a first alignment boss, a second alignment boss, a tapered portion, a mating end, and a tapered end, the first alignment boss having a first alignment aperture, the second alignment boss having a second alignment aperture, the body formed around and adhered to the first optical fiber and the second optical fiber, and wherein
   the first alignment aperture, the second alignment aperture, the first optical fiber, and the second optical fiber form a plane, and wherein
   the first alignment aperture is substantially parallel to the first optical fiber, and wherein
   the first alignment aperture is substantially parallel to the second alignment aperture, and wherein
   the body is symmetric about the plane, and wherein
   the fist alignment boss and the second alignment boss straddle the first optical fiber and the second optical fiber, and wherein
   the mating end and the tapered end straddle the first alignment boss and the second alignment boss, and wherein
   the mating end and the tapered end straddle the tapered portion, and wherein
   the mating end is separated from the tapered end by a third length, and wherein
   the first length of the first optical fiber is greater than the third length, and wherein
   the polished end of the first optical fiber and the polished end of the second optical fiber are substantially flush with the mating end.

21. A multi-fiber optic device according to claim 20 wherein the body is made of a polymer material, and wherein the polymer material is transformed via heat into a flowable state and is introduced into a mold containing the first optical fiber and the second optical fiber, and wherein heat is extracted from the mold so as to transform the polymer material from the flowable state to a solid state within the mold, and wherein the flowable state of the polymer material is introduced into the mold between the mating end and the tapered portion of the body.

22. A multi-fiber optic device according to claim 21 wherein first optical fiber is made of a glass material, and wherein the second optical fiber is made of a glass material.

23. A multi-fiber optic device according to claim 22 wherein a coefficient of thermal expansion of the glass material of the first optical fiber is substantially the same as a coefficient of thermal expansion of the polymer material of the body.

24. A method of making a multi-fiber optic device comprising the steps of:

stripping a matrix away from a multi-fiber optic cable so as to expose optical fibers;

inserting the optical fibers into a mold;

introducing a flowable polymer into the mold;

extracting heat from the mold so that the flowable polymer solidifies around and adheres to the optical fibers so as to form a body having optical fibers;

removing the body having optical fibers from the mold;

cleaving the optical fibers extending past a first end of the body;

cleaving the optical fibers extending past a second end of the body so as to form splicing ends of the optical fibers;

polishing the optical fibers adjacent to the first end of the body;

inserting optical fibers of a flex circuit through a first aperture of a sheath;

positioning the splicing ends of the optical fibers of the body adjacent to ends of the optical fibers of the flex circuit;

splicing the splicing ends of the optical fibers of the body to the ends of the optical fibers of the flex circuit so as to form a spliced area;

positioning the sheath around the body so as to encompass the spliced area;

introducing an adhesive material into a second aperture of the sheath so that the adhesive material contacts the sheath and the body; and curing the adhesive material so that the sheath is bonded to the body.

25. A method according to claim 24 wherein the step of splicing is achieved by way of a lasing device.

26. A method according to claim 25 wherein the step of inserting optical fibers of a flex circuit through the aperture of a sheath includes the sheath being made of a material which is transparent to U.V. radiation.

27. A method according to claim 26 wherein the step of introducing an adhesive includes a U.V. curable adhesive.

28. A method according to claim 27 wherein the step of curing includes exposing the U.V. curable adhesive to U.V. radiation.

29. A method according to claim 28 wherein a coefficient of thermal expansion of the optical fibers is substantially the same as a coefficient of thermal expansion of the polymer material of the body, and wherein a coefficient of thermal expansion of the adhesive material, once cured, is substantially the same as the coefficient of thermal expansion of the optical fibers.

* * * * *